United States Patent
Leigh et al.

(10) Patent No.: US 9,841,839 B2
(45) Date of Patent: Dec. 12, 2017

(54) SYSTEM FOR MEASURING LATENCY ON A TOUCH DEVICE

(71) Applicant: Tactual Labs Co., New York, NY (US)

(72) Inventors: Darren Leigh, Round Hill, VA (US);
Clifton Forlines, Newton, MA (US);
Daniel Wigdor, Littleton, MA (US);
Steven Leonard Sanders, New York, NY (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 14/316,177

(22) Filed: Jun. 26, 2014

(65) Prior Publication Data
US 2015/0097803 A1 Apr. 9, 2015

Related U.S. Application Data

(60) Provisional application No. 61/887,615, filed on Oct. 7, 2013.

(51) Int. Cl.
*G06F 3/041* (2006.01)

(52) U.S. Cl.
CPC ............ *G06F 3/0418* (2013.01); *G06F 3/041* (2013.01); *G06F 2203/04103* (2013.01)

(58) Field of Classification Search
None
See application file for complete search history.

(56) References Cited

U.S. PATENT DOCUMENTS

| | | | | |
|---|---|---|---|---|
| 9,317,147 B2* | 4/2016 | Welch | ..... | H04N 17/00 |
| 2012/0187956 A1* | 7/2012 | Uzelac | ..... | G01R 31/28 324/537 |
| 2012/0188197 A1* | 7/2012 | Uzelac | ..... | G06F 3/044 345/174 |
| 2012/0280934 A1* | 11/2012 | Ha | ..... | G06F 11/2221 345/174 |
| 2013/0113751 A1* | 5/2013 | Uzelac | ..... | G06F 3/0418 345/174 |
| 2013/0197862 A1* | 8/2013 | Uzelac | ..... | G06F 3/0418 702/186 |
| 2013/0227348 A1* | 8/2013 | Stephenson | ..... | G06F 3/0488 714/27 |

* cited by examiner

*Primary Examiner* — David D Davis
(74) *Attorney, Agent, or Firm* — Adam B. Landa

(57) ABSTRACT

A system and method are disclosed for measuring latency in a device which includes a user interface that receives user input and provides output in response. In an embodiment, a body separate from the device under test is provided. A first sensor operatively attached to the body detects a touch event input to the device at a first time and a second sensor detects a response output from the device at a second time. A computational engine computes a time differential between the first time and the second time and an output outputs an indication of a measurement of latency in the device, the measurement being reflective of the time differential between the first time and the second time.

59 Claims, 6 Drawing Sheets

SYSTEM FOR MEASURING LATENCY ON A TOUCH DEVICE

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed system and method relate in general to the field of user interfaces, and in particular to user input testing systems.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

Figure 1:
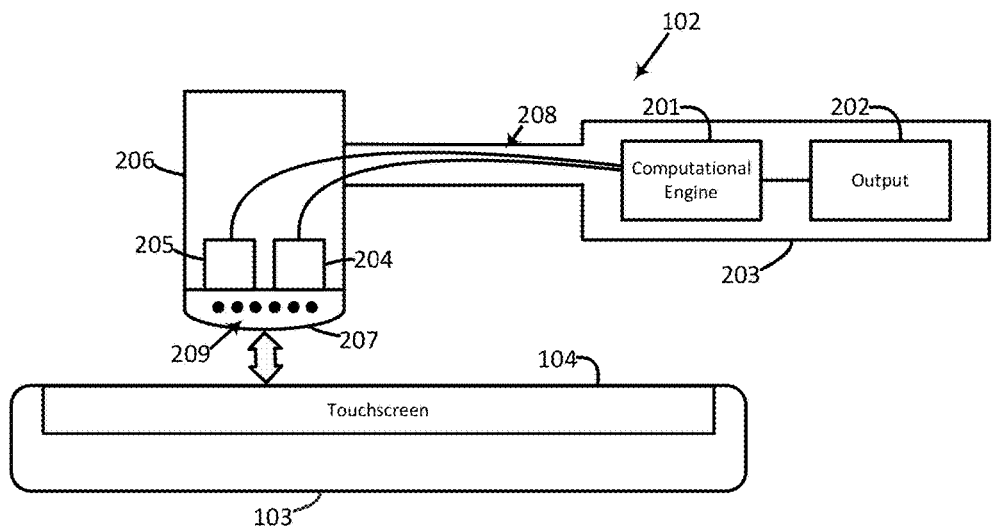
FIG. 1 shows a schematic block diagram illustrating functional blocks of the disclosed latency measuring and testing system in accordance with an embodiment thereof.

This application relates to measuring or testing latency in user interfaces, including but not limited to fast multi-touch sensors of the types disclosed in U.S. patent application Ser. No. 13/841,436 filed Mar. 15, 2013 entitled "Low-Latency Touch Sensitive Device," U.S. Patent Application No. 61/928,069 filed Jan. 16, 2014 entitled "Fast Multi-Touch Update Rate Throttling," U.S. patent application Ser. No. 14/046,819 filed Oct. 4, 2013 entitled "Hybrid Systems And Methods For Low-Latency User Input Processing And Feedback," U.S. Patent Application No. 61/798,948 filed Mar. 15, 2013 entitled "Fast Multi-Touch Stylus," U.S. Patent Application No. 61/799,035 filed Mar. 15, 2013 entitled "Fast Multi-Touch Sensor With User-Identification Techniques," U.S. Patent Application No. 61/798,828 filed Mar. 15, 2013 entitled "Fast Multi-Touch Noise Reduction," U.S. Patent Application No. 61/798,708 filed Mar. 15, 2013 entitled "Active Optical Stylus," U.S. Patent Application No. 61/710,256 filed Oct. 5, 2012 entitled "Hybrid Systems And Methods For Low-Latency User Input Processing And Feedback," U.S. Patent Application No. 61/845,892 filed Jul. 12, 2013 entitled "Fast Multi-Touch Post Processing," U.S. Patent Application No. 61/845,879 filed Jul. 12, 2013 entitled "Reducing Control Response Latency With Defined Cross-Control Behavior," U.S. Patent Application No. 61/879,245 filed Sep. 18, 2013 entitled "Systems And Methods For Providing Response To User Input Using Information About State Changes And Predicting Future User Input," U.S. Patent Application No. 61/880,887 filed Sep. 21, 2013 entitled "Systems And Methods For Providing Response To User Input Using Information About State Changes And Predicting Future User Input," U.S. patent application Ser. No. 14/046,823 filed Oct. 4, 2013 entitled "Hybrid Systems And Methods For Low-Latency User Input Processing And Feedback," U.S. patent application Ser. No. 14/069,609 filed Nov. 1, 2013 entitled "Fast Multi-Touch Post Processing," U.S. Patent Application No. 61/887,615 filed Oct. 7, 2013 entitled "Touch And Stylus Latency Testing Apparatus," and U.S. Patent Application No. 61/930,159 filed Jan. 22, 2014 entitled "Dynamic Assignment Of Possible Channels In A Touch Sensor," and U.S. Patent Application No. 61/932,047 filed Jan. 27, 2014 entitled "Decimation Strategies For Input Event Processing." The entire disclosures of those applications are incorporated herein by this reference.

In various embodiments, the present disclosure is directed to systems and methods to measure the input latency of direct-manipulation user interfaces on touch-sensitive and stylus-sensitive devices, such as touchscreens. Direct physical manipulation of digital objects/controls crafted to mimic familiar, real-world interactions is a common user-interface metaphor employed for many types of input devices, such as those enabling direct-touch input, stylus input, in-air gesture input, as well as indirect input devices, including mice, trackpads, pen tablets, etc.

For the purposes of the present disclosure, touch-input latency in a user interface refers to the time it takes for the user to be presented with a graphical, audial, and/or vibrotactile response to a physical touch or stylus input action. Tests have shown that users prefer low touch-input latencies and can reliably perceive end-to-end, graphical input-to-response latencies as low as 5-10 ms.

In various embodiments, touch-input latency in a single-touch, multi-touch and/or stylus user input device, and in the system processing this input, can have many sources. Such sources include, e.g., (1) the physical sensor that captures touch events, (2) the software that processes touch events and generates output for conveying to the user, (3) the output (e.g., display) itself, (4) data transmission between components, including bus, (5) data internal storage in either memory stores or short buffers, (6) interrupts and competition for system resources, (7) other sources of circuitry can introduce latency, (8) physical restrictions, such as the speed of light, and its repercussions in circuitry architecture, and (9) mechanical restrictions, such as the time required for a resistive touch sensor to bend back to its 'neutral' state.

While reducing touch-input latency is increasingly an important goal for many smart device manufacturers including but not limited to smartphone, tablet, PC, gaming, virtual reality, augmented reality and peripheral equipment manufacturers, at present there exists no standardized, inexpensive, reliable and repeatable system and/or method to measure and compare the touch-input latencies of smart devices during and after their manufacture.

In an embodiment, the presently disclosed system fills such unmet industry need by providing a means to measure the touch-input latency of a system at various points in the sensing/processing/display chain, including (but not limited to) the end-to-end latency of direct-manipulation user interfaces on smart devices, such as smart phones, tablets or computers, through the advent of a standardized, cheap, reliable and repeatable latency testing apparatus and method.

In an embodiment, the presently disclosed system measures the input latency of a touchscreen device. The term "input latency" herein means the difference in time between a touch event on a computing system's touchscreen and the touchscreen's resulting graphical, audial, or vibrotactile response to that touch event. As used herein, the term "touch event" and the word "touch" when used as nouns include a near touch and a near touch event, or any other gesture that can be identified using a sensor. For example, in a typical touchscreen application that includes digital button user-interface controls, a user will press a digital button with their finger, and the display will change to indicate that a digital button was pressed, such as by changing the color or appearance of that digital button user-interface control. The time between the user's touching of this digital button and the resulting graphical change is the input latency of a computing system, and the presently disclosed system can measure such touch-input latency.

FIG. 1 illustrates the use of this the presently disclosed system in an embodiment. A user holds the system referred to herein as the latency measuring system 102 in his or her hand and gently taps the surface of a touchscreen 104 which is part of the test device 103 whose end-to-end latency is to be measured. In an embodiment, this test device 103 could be but is not limited to a smartphone, tablet or touch PC.

In an embodiment, the latency measuring system 102 is configured to be intentionally dropped by a user onto a touchscreen 104 of the test device 103 whose end-to-end latency is to be measured.

In various embodiments, the latency measuring system 102 uses two sensors to measure the time at which the latency measuring system 102 physically contacts a touchscreen 104 and the time at which the resulting graphical change occurs in the touchscreen display in response to the hammer's 102 simulated touch input. The first sensor 204 can be a contact sensor that measures physical contact or near physical contact between the latency measuring system 102 and a touchscreen 104. The second sensor 205 can be a graphical-change sensor that measures the change in graphics displayed on a touchscreen 104 in response to the latency measuring system's simulated touch input.

In an embodiment, the latency of both of these sensors together is lower than the touch-input latency of the test device 103 that is being measured.

In other embodiments, the component of the overall time/latency measured which is due to the latency of the hammer's 102 internal components (sensors, circuitry, etc.) is fixed and subtracted from the measured end-to-end latency of a test device 103 when reporting that test device's touch-input latency.

In other embodiments, this hammer-based latency is variable, but detectable and detected, so that such latency or an estimate thereof can be subtracted from the reported end-to-end touch-input latency of a test device 103 when producing a reported latency measurement.

In an embodiment, the first sensor 204 (e.g., a contact sensor) can be a transducer that converts mechanical shock into an electrical signal.

In an embodiment, this transducer is a piezo-electric transducer.

In another embodiment, this transducer is a ferroelectric transducer. In another embodiment, this transducer is an accelerometer.

The first sensor 204 (e.g., a contact sensor) is positioned such that it converts the mechanical shock that occurs when the latency measuring system 102 contacts the touchscreen 104 into an electrical signal. The first sensor 204 is connected 208 to a computational engine 201 that is capable of measuring the changes in electrical signals. In an embodiment, the computational engine marks a first time when the first sensor is triggered and a second time when the second sensor is triggered, and determine the difference between the two times in connection with calculating latency. In an embodiment, the computational engine comprises a free running clock that is triggered upon a signal from the first sensor and stopped upon a signal from the second sensor, thereby providing data reflecting the measured latency.

In an embodiment, this change in signal emitted from the first sensor 204 is converted from an analog signal into a digital signal before it is measured by the computational engine 201.

The latency measuring system's computational engine 201 could comprise but is not limited to interconnected, processor and memory computer system components including system-on-a-chip (SoC), central-processing unit (CPU), micro-controller-unit (MCU), field-programmable gate-array (FPGA), NAND memory, vertical NAND (vNAND) memory, random-access memory (RAM), resistive random-access memory (ReRAM) and magnetoresistive random-access memory (MRAM).

In an embodiment, the second sensor 205 (e.g., a graphical-change sensor) is a photodetector that converts light into an electrical signal.

In an embodiment, the photodetector is a reverse-biased LED that acts as a photodiode. In various embodiments, this photodetector may be an Active Pixel Sensor (APS), a Charge-Coupled Device (CCD), a photoresistor, a photovoltaic cell, a photodiode, photomultiplier, phototube or quantum-dot photoconductor.

In an embodiment that might be useful for a reflective display technology, the second sensor 205 is paired with a light source that illuminates the display area to be sensed. The light source could be ambient light or could be a light source that is part of the latency measuring device.

The second sensor 205 (e.g., a graphical-change sensor) is positioned such that changes to the display result in changes in an electrical signal. The second sensor 205 is operably connected to the computational engine 201 that is capable of measuring the changes in electrical signals.

In an embodiment, this change in signal emitted from the second sensor 205 is converted from an analog signal into a digital signal before it is measured by the computational engine 201.

In an embodiment, the first sensor 204 (e.g., a contact sensor) and the second sensor 205 (e.g., a graphical-change sensor) are proximate such that contact between the latency measuring system 102 and a touchscreen 104 at the location of the first sensor 204 generates a change in the touchscreen's 104 displayed graphics that is sensed by the second sensor 205.

In an embodiment, the first sensor 204 and second sensor 205 are both housed in a common housing 206. This common housing 206 is connected to a second housing 203 that holds the computational engine 201. The second housing 203 can be shaped to be operable as a handle and the system 102 is configured to allow a user to hold the second housing and cause first housing to tap on an area of the device under test 103.

In another embodiment, the latency measuring system's computational engine 201 and sensors 204, 205 are placed in the same housing.

In an embodiment, the latency measuring system 102 includes an output 202 connected to the computational engine 201. The output 202 may comprise, e.g., a read-out display (e.g., an LCD, LED, OLED or electrophoretic display), a speaker, a light, a light reflective indicator, or a source of haptic output. After calculating the latency of the test device 103, the computational engine 201 sends this measurement to the latency measuring system's output 202 which then displays or otherwise identifies (e.g., audibly) the measurement or information reflective thereof to a user. The output 202 may provide an indication of a measurement of latency that is either qualitative or quantitative. The output 202 may be connected to the computational engine 201 by a wired or wireless interface.

In an embodiment, the output 202 is embedded within or mounted on the latency measuring system's chassis.

In an embodiment, the output 202 is discrete/unattached from the latency measuring system 102.

In an embodiment, the output 202 is the display of a discrete smartphone, tablet or PC including but not limited to the test device 103 under examination.

Figure 2A:
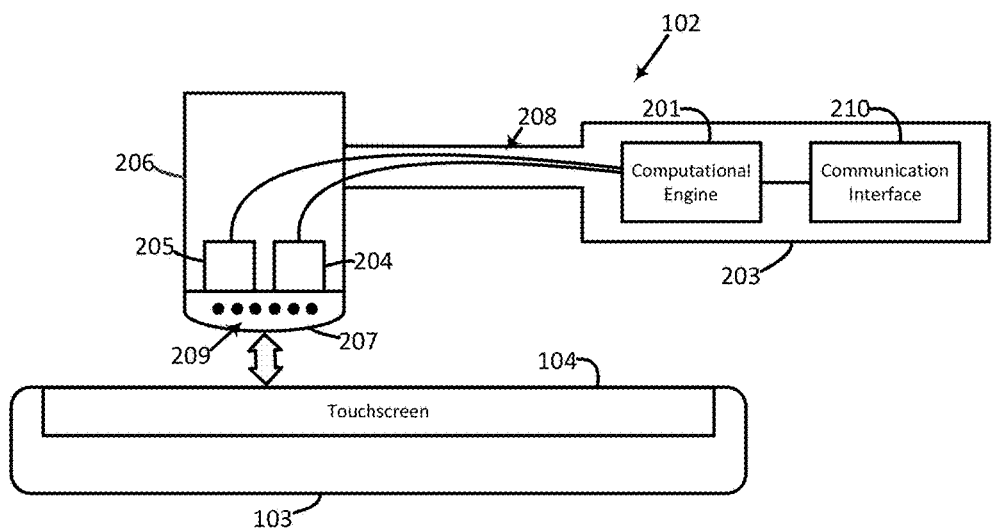
FIGS. 2A and 2B show schematic block diagrams illustrating functional blocks of the disclosed latency measuring and testing system in accordance with alternate embodiments thereof.

With reference to FIG. 2A, in another embodiment, the latency measuring system 102 includes a communication interface 210 for communicating data reflecting the measured latency to another device or the test device 103, such as a smartphone, tablet or PC. In an embodiment, the communication interface 210 may comprise a wireless network interface such as, for example, a bluetooth, bluetooth low-energy (BLE), WiFi or WAN interface. The communication interface 210 may also be a wired interface, such as a USB interface. The communication interface 210 may be connected to the computational engine 201 by a wired or wireless interface. In an embodiment, the computational engine is a processor in the device 103 or in another device.

Figure 2B:
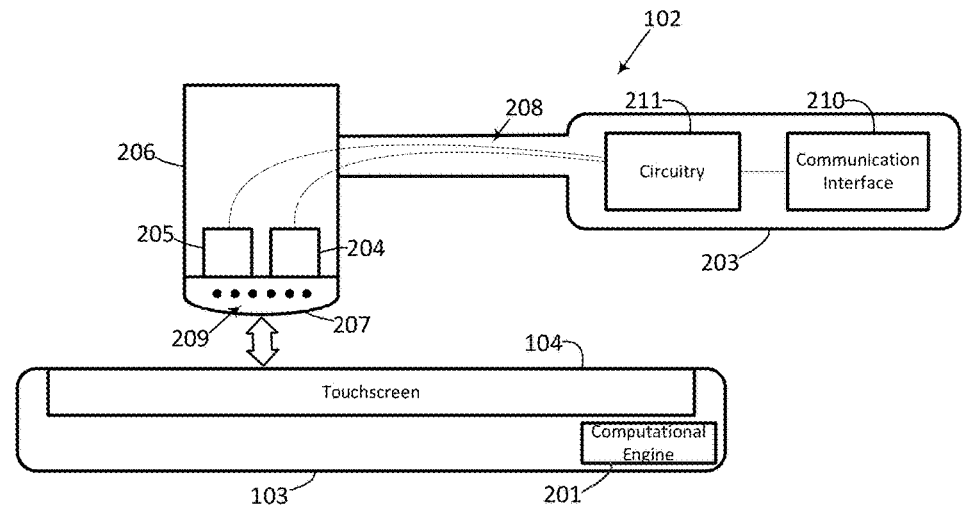

With reference to FIG. 2B, in another embodiment, the computational engine 201 can be part of the device under test 103 and circuitry 210 operatively connected to the first sensor and the second sensor is configured to output time data reflective of a measurement of latency, such as data from which the latency can be calculated or the measured latency. This output is communicated to the device under test 103 via the communication interface 210 of the latency measuring system 102. Alternatively, the computational engine 201 can be part of a third device such as a smartphone, tablet or PC and circuitry 210 can be configured to output such time data to the third device via the communication interface 210 of the latency measuring system 102. In this respect, the invention can provide a method for measuring latency at a plurality of points on a device. The method can be implemented by receiving, via a communication interface on the device, time data from an external time data generator (e.g., the system 102) that generates first data representing a first time at which a touch event is created and a second time at which the device outputs a response to the touch event, the time data being reflective of a measurement of latency between the first time and the second time. The time data is then used to determine a latency associated with the device, and the latency is displayed or otherwise conveyed by a display or other output of the device. In an embodiment, the latency measuring system 102 comprises a signal emitter that emits a signal at a first time that a controller of the device would interpret as a physical touch event, whereby a simulated physical touch event is triggered in the device.

With continued reference to FIG. 1, in an embodiment, one or more of the connections 208 between the latency measuring system's computational engine 201, output 202, and sensors 204, 205 are physical wires. In another embodiment, one or more of these connections 208 are wireless connections. Such wireless connections may be provided, for example, by a wireless network interface such as a bluetooth, bluetooth low-energy (BLE), WiFi or WAN interface. This allows the latency measuring system 102 to perform its required computations to measure end-to-end latency utilizing a computational engine 201 in an existing computing device including but not limited to a discrete smartphone, tablet or PC.

In an embodiment, the discrete smartphone, tablet or PC used to perform and display the results of latency measurement from the readings of the latency measuring system's sensors is the test device 103 undergoing measurement.

In some embodiments, the mere contact between the latency measuring system 102 and the touchscreen 104 simulates a single, physical touch-down event from a user.

In an embodiment, the latency measuring system 102 includes a contact area 207 that rests between the sensors 204, 205 and the touchscreen 104. This contact area 207 is composed of a material having properties such that physical contact between the contact area 207 and the touchscreen 104 will produce touch input. Such material may comprise, e.g., any material known for incorporation into the tip of a stylus to cause the stylus to produce a touch input on a touchscreen.

In other embodiments, the contact area 207 of the latency measuring system 102 is designed, and the test device 103 is configured so that a physical touch-down event of the latency measuring system's contact area 207 will not be detected by the touchscreen 104 of a test device 103 until a signal is sent to it. This allows the user to rest the latency measuring system 102 on the display during a latency testing procedure.

In an embodiment, a computational engine 201 or other mechanism can generate a sequence of simulated single and/or multiple touch events (random, predetermined, or responsive to output) even when the contact area 207 of the latency measuring system 102 is placed in stationary physical contact with the touchscreen 104.

In an embodiment, these single and/or multiple touch events are simulated by injecting from the contact area 207 to the touchscreen 104 a signal that mimics signals that the touchscreen 104 controller of the test device 103 would normally interpret as a physical touch event.

In an embodiment, these signals are electrical and emitted from the latency measuring system's contact area 207 by one or more electrical signal generators 209 spaced apart wider than the row/column pitch of a capacitive touchscreen 104. In an embodiment, these electrical signal generators 209 are placed beneath a thin non-conductive contact area 207. In an embodiment, these electrical signal generators 209 protrude through the contact area 207 to contact the touchscreen 104 directly. In an embodiment, these electrical signal generators 209 are arranged in a grid. In an embodiment, these electrical signal generators are arranged in a random pattern.

Further embodiments of the system enable stationary touch-event simulation from the latency measuring system 102. In such embodiments, portions of the contact area 207 can be formed from dielectric materials whose dielectric characteristics are capable of being altered through electrical signalling controlled by the computational engine 201. These materials can comprise but are not limited to strontium titanate and barium strontium titanate. A touch event is mimicked by increasing the dielectric of the material so that, to the touch sensor, it appears that a finger, stylus or other dielectric object has come into contact with the touch sensor.

In another embodiment that enables stationary touch-event simulation from the latency measuring system 102, a contact area 207 on the latency measuring system 102 comprises one or more discrete pieces of dielectric or conductive material that are brought into physical contact with the touchscreen 104 using one or more linear actuators. The linear actuators and pieces of dielectric or conductive material are controlled by signaling from a computational engine 201. These materials could be but are not limited to plastic, rubber, water-filled containers, metals, metal-loaded plastics, etc. These linear actuators could be but are not limited to mechanical actuators, hydraulic actuators, pneumatic actuators, fluidic systems, piezoelectric actuators, electro-mechanical actuators, linear motors or rotary-driven cams. These computationally-controlled signals could be but are not limited to electrical, optical, mechanical, pneumatic, hydraulic and acoustic signals.

In an embodiment, the touchscreen 104 and not the latency measuring system 102 is connected to one or more linear actuators which moves it into physical contact with the latency measuring system's contact area 207 to generate simulated touch-tap and touch-drag events without human user intervention.

In an embodiment, the contact area 207 is deformable and mimics the deformation of a human finger when a finger comes into physical contact with a touchscreen 104. In an embodiment, the degree of deformation is measured and recorded. In another embodiment, the degree of deformation at a given time is used in performing the touch-latency measurement calculations herein described. In particular, the degree of deformation could be used in place of or alongside the first sensor 204 (e.g., a contact sensor) to indicate the moment of physical contact between the contact area 207 of the latency measuring system 102 and the touchscreen 104 of a test device 103.

In an embodiment, the contact area 207 is translucent to light such that the second sensor 205 is capable of sensing graphical changes through the contact area 207.

In another embodiment, the contact area 207 includes physical openings or holes such that the second sensor 205 can sense graphical changes emitted by a test device 103 in response to touch input through one or more of these openings or holes. These opening or holes in the contact area 207 can either be covered by a substrate translucent to light, or be left completely uncovered.

In an embodiment, the contact area 207 is composed of materials such that the first sensor 204 can sense the transferred shock between the touchscreen 104 and contact area 207.

In an embodiment, the test device 103 is configured to run software that causes its touchscreen 104 to graphically respond to simulated touch inputs from the latency measuring system 102 in a manner such that those graphical responses can be easily measured and recorded by the second sensor 205. For example, in an embodiment, a software program could be pre-installed on the test device 103 so that a touchscreen 104 remains entirely black when no physical touch-input events are received and then changes to entirely white when a single touch-input event is received.

In another embodiment, a pre-installed software program on the test device 103 could set a touchscreen 104 to remain entirely black when no physical touch-input events are received, and then to render white squares in response to each simulated touch event received from the latency measuring system 102 where each of the white-square graphical responses are sized appropriately to ensure easy detection by the second sensor 205 (e.g., a graphical-change sensor).

In another embodiment, a pre-installed software program on the test device 103 could provide a user with visual on-screen guides and instructions about where, when and how to bring the latency measuring system 102 into physical contact with the touchscreen 104 of a given test device 103 to ensure uniformity of measurement methodology across multiple latency tests and/or multiple test devices 103. For example, in an embodiment, a pre-installed software program on a test device 103 could draw an empty white box on its touchscreen 104 alongside on-screen textual cues to indicate at which point on the touchscreen's 104 surface a user should bring the latency measuring system 102 and the touchscreen 104 into physical contact. In another embodiment, a pre-installed software program on a test device 104 could draw a linear path with arrows and textual annotations indicating exactly where and at what velocity a user should drag a latency measuring system's contact area 207 across a touchscreen 104. In another embodiment, a pre-installed software program on a test device 104 could show a user a numeric countdown in seconds to inform him or her exactly how long the latency measuring system's contact area 207 should rest on a touchscreen 104 before lifting it off of the test device 104.

Figure 3:
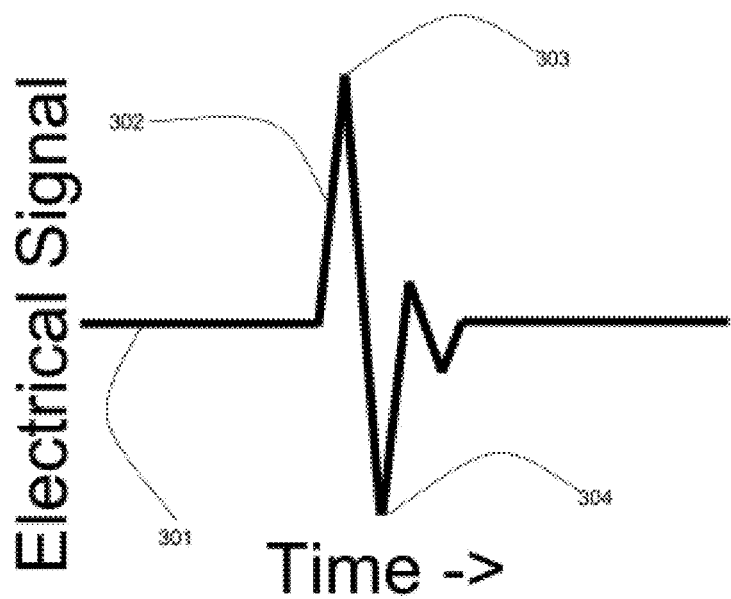
FIG. 3 shows a line graph illustrating a change in the electrical signal over time for a particular physical contact event.

FIG. 3 shows a line graph 301 of the change in the electrical signal over time for a particular physical contact event between the latency measuring system 102 and the touchscreen 104 of the test device 103.

In an embodiment, the computational engine 201 is configured to measure and identify key features in the signal represented by the line graph 301, which may include one or more of the following—a rapid rise (or fall) in the signal 302, a peak in the signal 303, a valley in the signal 304, or the crossing of a signal threshold. The time at which this measured feature occurs is recorded by the computational engine 201.

As indicated above, the second sensor 205 can be a photodetector that converts light into an electrical signal and the second sensor 205 is connected 208 to a computational engine 201 that can sense the change in this signal over time.

Figure 4:
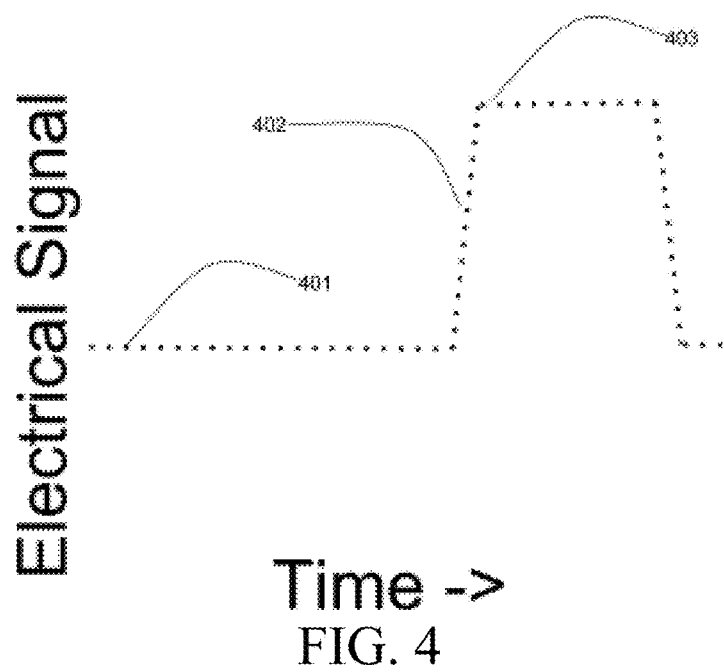
FIG. 4 shows a line graph illustrating the measured change in signal over time for a particular graphical change on a touch-sensitive device.

FIG. 4 shows a line graph 401 depicting the measured change in signal over time for a particular graphical change on the touchscreen 104 as a dotted line.

In an embodiment, the computational engine 201 is configured to identify key features in this line graph 401, which may include one or more of the following—a rapid rise (or fall) in the signal 402, a peak in the signal 403, a valley in the signal, or the crossing of a signal threshold. The time at which this feature occurs is recorded by the computational engine 201.

Figure 5:
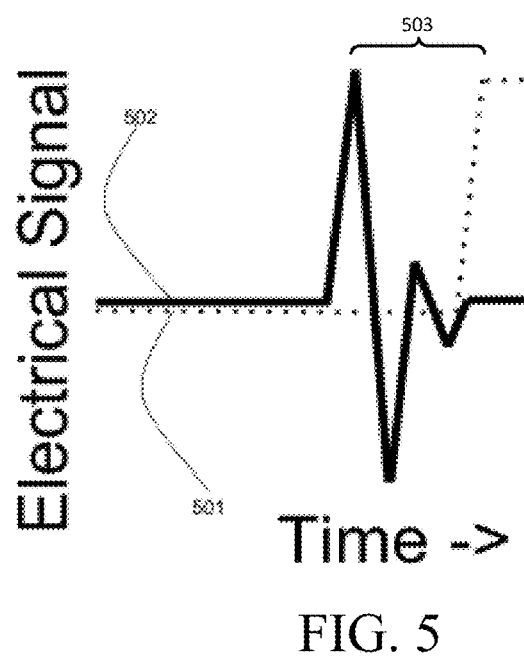
FIG. 5 shows overlaid graphs of a particular measured change in signals from a contact sensor and a graphical-change sensor, respectively.

FIG. 5 shows the overlaid graphs of a particular measured change in the signals from the first 502 (which may be a contact sensor) and the second sensor 501 (which may be a graphical-change sensor), respectively. After the computational engine 201 has recorded the time of the two identified features 503 (in this case the first peak in the signal 303, 403) from the two line graphs generated by the latency measuring system's two sensors, it calculates the difference in times between these two identified features 503. This measured difference in the timing of identified features 503 represents the time, or end-to-end test device 103 latency between the latency measuring system's simulated touch events on a touchscreen 104 and the resulting change in graphics on a touchscreen 104 in response to the latency measuring system's simulated touch events.

Figure 6:
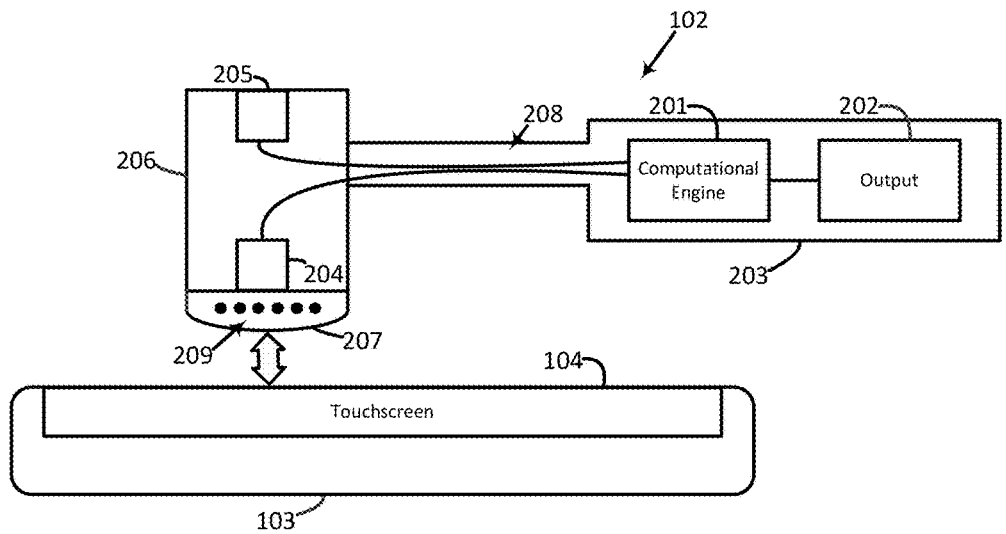
FIG. 6 shows a schematic block diagram illustrating functional blocks of the disclosed latency measuring and testing system in accordance with an embodiment configured to work with a touchscreen that employs a projector for displaying graphics.

FIG. 6 shows an embodiment of the system that is configured to work with a touchscreen 104 that employs an overhead projector for displaying graphics. In this embodiment, the second sensor 205 (e.g., a graphical-change sensor) is positioned at the top of the common housing 206 so that graphics which are projected down from above in response to user input are sensed by the second sensor 205 when physical contact between the latency measuring system 102 and the touchscreen 104 is sensed by the first sensor 204 positioned at the bottom of the common housing 206. In this embodiment, the contact area 207 can have any optical properties as it does not interfere with the correct operation of the second sensor 205.

Figure 7:
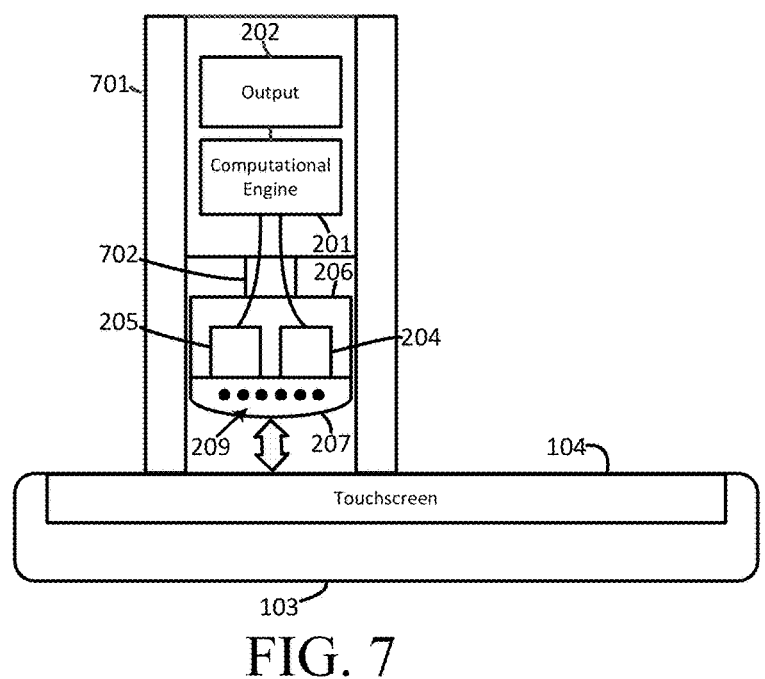
FIG. 7 shows a schematic side view of an embodiment in which a user of the disclosed system is not required to manually strike a touch-sensitive device with the system in order to measure latency of a device.

FIG. 7 illustrates a variation of the system in which a user of the latency measuring system 102 is not required to manually strike the touchscreen 104 with the latency measuring system 102 in order to measure end-to-end touch input latency on a test device 103. In this embodiment, the common housing 206 is positioned above the touchscreen 104 inside of a stable housing 701 that sits directly on top of the touchscreen 104. The stable housing 701 is composed of a material which is not sensed by the touchscreen 104. The common housing 206 is connected to the stable housing 701 by means of a standoff 702 which is capable of movement. In this embodiment, the latency measuring system 102 is placed on top of the touchscreen 104, and then issued a command by a user to measure the latency of the test device 103. Upon receiving this command, the latency measuring system 102 activates the standoff 702 which moves the common housing 206 so that it comes into contact with the touchscreen 104 in a reliable and repeatable manner.

In an embodiment, the standoff 702 is a linear actuator. In variations of this embodiment, the standoff 702 could be composed of but is not limited to a mechanical actuator, a hydraulic actuator, a pneumatic actuator, a fluidic system, a piezoelectric actuator, an electro-mechanical actuator, a linear motor or a rotary driven cam.

Figure 8:
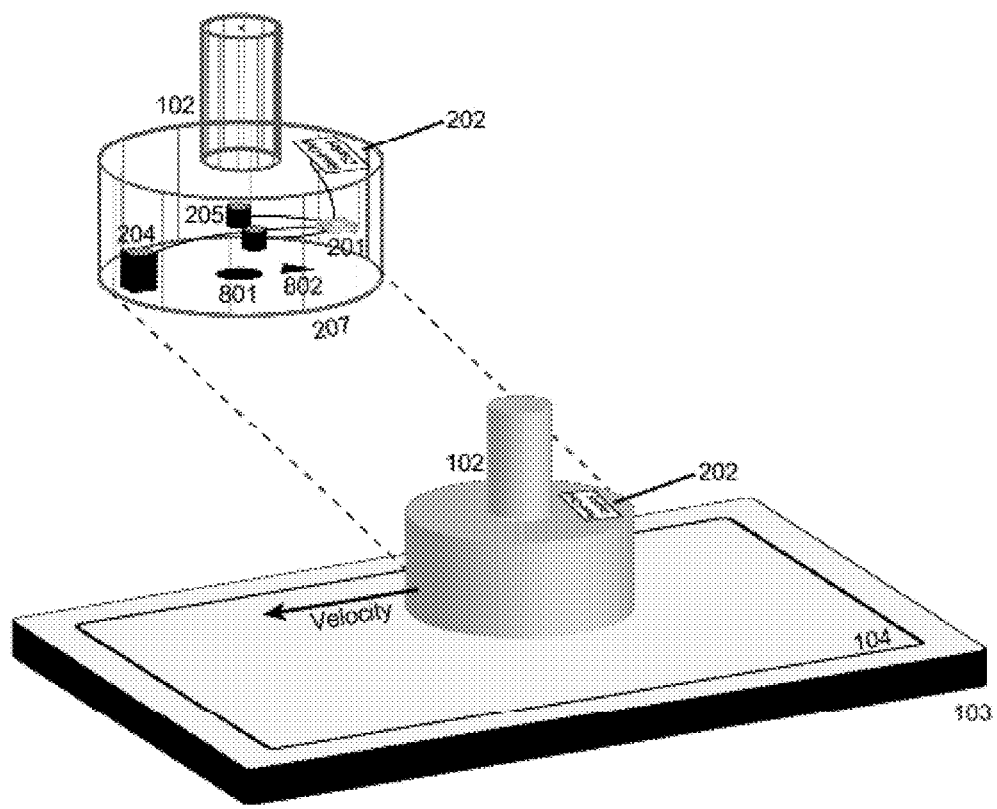
FIG. 8 shows a perspective view illustrating an embodiment of the disclosed system that can be tapped upon or slid across a touch-sensitive area 104 of a test device.

FIG. 8 illustrates an embodiment of the latency measuring system 102 as a tangible object that can be tapped upon or slid across a touchscreen 104 of a test device 103 to measure a test device's touch or stylus input latency during tap, drag or inking operations.

In an embodiment, the bottom of the latency measuring system 102 is a contact area 207 comprised of one or more second sensors 205 (e.g., graphical-change sensors), a touch-stimulation region 801 composed of materials that when in physical contact with a touchscreen 104 of a test device 103 mimics physical touch input events, and a first sensor 204 (e.g., a contact sensor) to detect when the latency measuring system 102 comes into physical contact with a test device's touchscreen 104.

In an embodiment, the touch-stimulation region 801 of the latency measuring system 102 is composed of a material with properties such that physical contact between the contact area 207 and the touchscreen 104 will produce touch input.

In other embodiments, the touch-stimulation region 801 of the latency measuring system 102 is designed, and the test device 103 is configured, so that a physical touch-down event of the touch-stimulation region 801 on a touchscreen 104 will not be detected by the touchscreen 104 of a test device 103 until a signal is sent to it. This allows the user to rest the latency measuring system 102 on the display during a latency testing procedure.

In an embodiment, the touch-stimulation region 801 is composed of a dielectric or conductive material.

In an embodiment, the touch-stimulation region 801 can be connected to a computational engine 201 to generate signals that simulate physical touch-down events on a touchscreen 104 as made by one or multiple fingers or styli when the latency measuring system 102 is stationary or moving.

As discussed in prior embodiments, when the latency measuring system 102 is stationary this enables the touch-stimulation region 801 to stimulate multiple, simultaneous and readily repeatable physical tap events on a touchscreen 104 of a test device 103 without requiring a human user to manipulate the latency measuring system 102.

By contrast, embodiments that simulate multiple physical touch events on the touch-stimulation region 801 while the latency measuring system 102 is being physically dragged by a user enable the system 102 to simulate complex multi-finger/styli gestures and ink events on a touchscreen 104 during a diagnostic procedure.

As aforementioned with reference to prior embodiments, such a computationally-controlled touch-stimulation region 801 could be composed of electrical signal generators 209 controlled by a computational engine 201 spaced apart wider than the row/column pitch of a capacitive touchscreen 104, dielectric materials whose dielectric characteristics can be altered through electrical signalling controlled by a computational engine 201, or the combination of one or more discrete pieces of dielectric or conductive material with one or more linear actuators.

In an embodiment, the second sensors 205, touch-stimulation region 801, first sensor 204, and output 202 are connected to a computational engine 201.

In another embodiment, only the second sensors 205, the first sensor 204, and output 202 are connected to a computational engine 201.

In another embodiment, only the second sensors 205 and the first sensor 204 are connected to a computational engine 201.

In an embodiment, the second sensors 205 are photodetectors that convert light into an electrical signal.

In an embodiment, the photodetectors are reverse-biased LEDs that acts as photodiodes. In various embodiments, this photodetector may be an APS, a CCD, a photoresistor, a photovoltaic cell, a photodiode, a photomultiplier, a phototube or quantum-dot photoconductor.

In an embodiment, the second sensors 205 are paired with one or more light sources that illuminate the touchscreen 104 area to be sensed by the second sensors 205. These light sources which improve the accuracy of second sensor 205 measurement across a variety of surfaces including glass, glossy or reflective surfaces could be but are not limited to one or more light-emitting diodes (LEDs) or infrared laser diodes.

The second sensors 205, which may be graphical change sensors, are positioned such that changes to a test device's display result in changes in an electrical signal, and such that they can detect recognizable features and patterns on the cover substrate of a test device's touchscreen 104. The second sensors 205 may be connected to a computational engine 201 that is capable of measuring the changes in electrical signals.

In an embodiment, this change in signal emitted from the second sensor 205 is converted from an analog signal into a digital signal before it is measured by the computational engine 201.

In an embodiment, the first sensor 204 and second sensor 205 are proximate such that contact between the latency measuring system 102 and a touchscreen 104 at the location of the first sensor 204 generates a change in the touchscreen's 104 displayed graphics that is sensed by the second sensor 205.

In an embodiment, the latency measuring system 102 is dragged around the touchscreen 104 of a test device 103 whose end-to-end drag latency is to be measured, the display of the touchscreen 104 shows a graphical marker 802 where the test device 103 believes the physical touch event mimicked by the latency measuring system 102 to be.

In an embodiment, the display of a test device's touchscreen 104 can be programmed to render a graphical marker 802 in any color, pattern and/or shape at any time and to display that graphical marker 802 against a colored and/or patterned background at any time that improves the accuracy of second sensor 205 measurement of both the position of a graphical marker 802 and of the position and velocity of the latency measuring system 102 at a given point in time.

In an embodiment, the position and velocity of the latency measuring system 102 as it is dragged across a touchscreen 104 is measured using an optical technique similar to that of an optical, laser, glaser, or dark-field mouse.

In an embodiment, the position and velocity of the latency measuring system 102 is measured using circuitry and an electro-mechanical measurement technique similar to that of a trackball mouse.

By measuring the velocity of the latency measuring system 102 across the touchscreen 104 and the physical distance between the center of a graphical marker 802 and the center of the system's physical touch-stimulation region 801, the latency measuring system 102 can measure the end-to-end touch-drag latency of a test device 103. If the velocity of the latency measuring system 102 is constant, the measured drag latency is equal to the physical distance between the center of a graphical marker 802 and the center of a system's touch-stimulation region 801, divided by the speed at which the latency measuring system 102 is travelling. If the velocity of the latency measuring system 102 is not constant, the relationship between the latency measuring system 102 and the relative position between the touch-stimulation region 801 and the graphical marker 802 will be a more complicated mathematical function.

In an embodiment, the position and velocity of the latency measuring system 102 are measured using the second sensors 205 and graphical changes and/or markers that are imposed on the display of a test device's touchscreen 104 for this purpose.

In an embodiment, the latency measuring system 102 combines the functions of tap and drag latency measurement through the addition of a first sensor 204 (e.g., a contact sensor) to the embodiment, so that it can measure the input latency of a test device's touchscreen 104 in either or both types of touch and/or stylus interactions. In this embodiment, as previously explained, the difference between the time of the latency measuring system's first physical "tap" contact simulation on the touchscreen 104 and the detection by the system's second sensors 205 of a pre-programmed graphical response to that simulated physical contact can be used to calculate the round-trip, touch or stylus input latency of a test device 103 for tap events.

In an embodiment, the system 102 is designed such that multiple latency measuring systems can be used simultaneously. In certain embodiments, the systems are wielded by multiple hands as they are placed on the touchscreen 104 of a test device 103. The positions and actions of the latency measuring systems 102 are disambiguated by the sensors they employ to determine position, velocity, tapping, etc.

As aforementioned, in an embodiment, the connections between the computational engine 201 and the latency measuring system's first sensor 204, second sensors 205 and the touch-stimulation region 801 could be physical wires or wireless including but not limited to bluetooth, bluetooth low-energy (BLE), WiFi or WAN.

Use of existing sensor components as well as the addition of new sensor components to the latency measuring system 102 connected to a computational engine 201 can enable a latency measuring system 102 to test the touch-input latency of other forms of a test device's response to touch-input beyond graphical responses, including audio and vibrotactile responses.

In an embodiment, the latency measuring system 102 can contain one or more first sensors 204 connected to a computational engine 201 to detect not only the first physical contact between the latency measuring system 102 and a test device's touchscreen 104, but also a test device's vibrotactile response. The difference in the latency measuring system's measured timing between the system's first simulated physical touch input event and a test device's first detected vibrotactile response is the touch-input latency of a test device's vibrotactile response to tap gestures. Similarly, the measured timing of changes in the frequency or intensity of a test device's vibrotactile response to multi-touch gesture, inking or drag commands recorded by the latency measuring system's first sensors 204 can be compared to the measured timing of when those finger/styli gestures were simulated by the latency measuring system 102 to determine the touch-input latency of a test device's vibrotactile response. As in computing the touch-input latency of graphical responses, any fixed or variable latency in the system's internal sensors and/or circuits used to detect a test device's response should be estimated and subtracted from the system's reported measurements of a test device's vibrotactile touch-input latency. As a latency measuring system's first sensors 204 can be connected to the system's computational engine 201 by a long physical wire or wirelessly, they can also be easily placed proximate to a test device's vibrotactile feedback components to ensure the most accurate readings of a test device's vibrotactile response latency.

Figure 9:
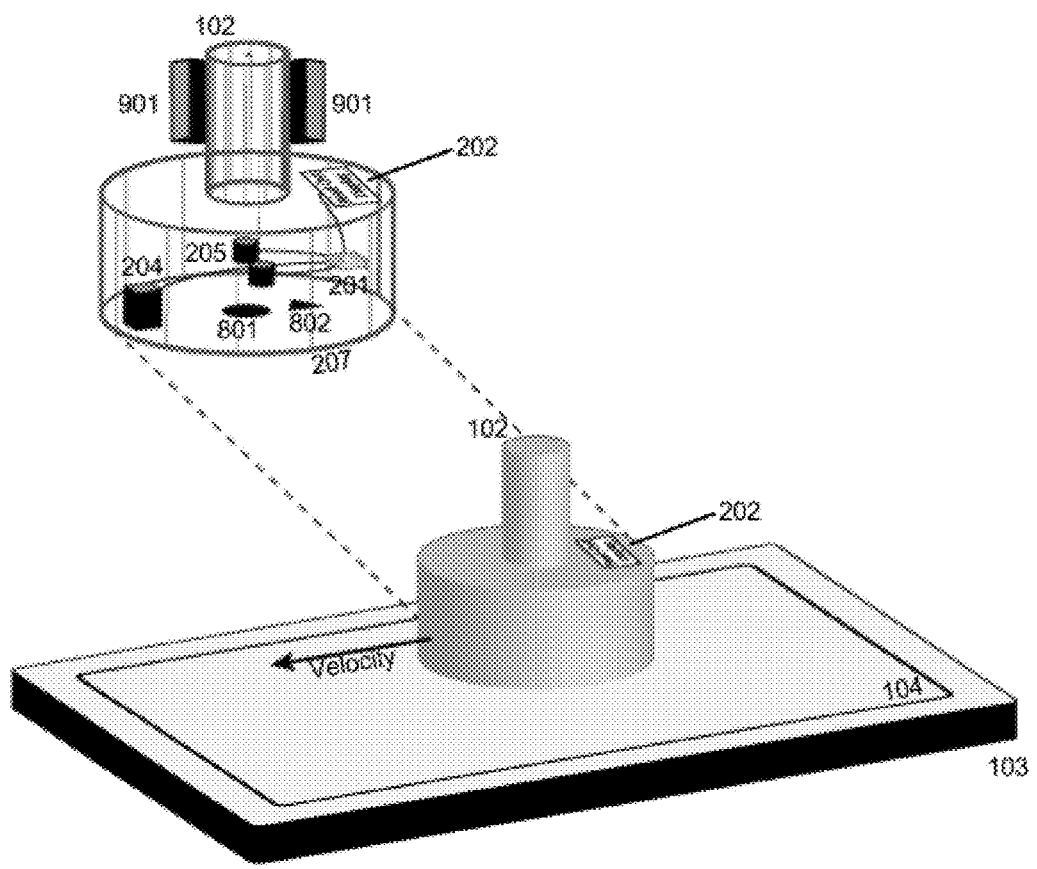
FIG. 9 shows a perspective view illustrating an embodiment of the disclosed system having one or more audio sensors 901 connected to a computational engine 201 to detect the timing of a test device's audial response to touch input.

As shown in FIG. 9, in an embodiment, the latency measuring system 102 can contain one or more audio sensors 901 connected to a computational engine 201 to detect the timing of a test device's audial response to touch-input. In an embodiment, the audio sensors 901 can be one or more compact microphone arrays. The measured timing difference between the latency measuring system's first simulated physical touch input event and a test device's first audial response to that touch event is the touch-input latency of a test device's audial response to tap gestures. Similarly, the difference in timing between changes in the frequency or intensity of a test device's audial response to more complex multi-touch gesture, inking or drag commands recorded by the latency measuring system's audio sensors 901 and the measured timing of when those physical finger/styli gestures were simulated by the latency measuring system 102 is the touch-input latency of a test device's audial response. In an embodiment, the timing of those physical finger/styli gestures is determined by measurements obtained from a latency measuring system's first sensors 204. In an embodiment, the exact timing of those simulated physical finger/styli gestures is known as the system's computational engine 201 generated them by injecting signals onto the surface of a test device's touchscreen 104. As in computing the touch-input latency of graphical responses, fixed or variable latency in the system's internal sensors and/or circuits should be estimated and subtracted from the system's reported measurements of a test device's audial touch-input latency. As a latency measuring system's audio sensors 901 can be connected to a system's computational engine 201 by a long physical wire or wirelessly, a system's audio sensors 901 can also be easily placed proximate to a test device's audio feedback components to ensure the most accurate readings of a test device's audial response. Such audio feedback components on a test device 103 can include but are not limited to stereo speakers.

In various embodiments, the device being used to measure latency can be the same device whose latency is being measured. In some such embodiments, the "touch" can be initiated by a user, and effectively simultaneously detected by the touch sensor and by another sensor in the device, such as an accelerometer, magnetometer, microphone, proximity sensor, or any sensor known to one skilled in the art (or asynchronously recorded, and compensated for). The response whose time is subsequently measured might be visual, in which case a camera or other light sensor might be used, or it might be auditory, in which case a microphone or other audio sensor might be used. In other embodiments, the response of an internal system or application process may instead be recorded, without actually outputting to an output device. In some embodiments, a mirror or other reflective surface may be required to cause the display to be visible to the camera. In other embodiments, sensors might be positioned to enable direct observation of the output (or surface to reflect sound from the speakers). In some embodiments, the initial 'touch' might be simulated, through the generation of one or more false 'touches'. This might be injected in software. It might also be generated through electrical or other trigger of the touch sensor itself. In some embodiments, some portion of the time between input and response might be estimated (eg: presumed to be some fixed time for a particular handset, class of device, sensor type, sensor model, etc). In other embodiments, the output of one or more sensors might be aggregated, so-as to provide an average response time (or other statistical means of aggregation).

The present system and methods are described above with reference to block diagrams and operational illustrations of methods and devices for measuring or testing latency. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While the invention has been particularly shown and described with reference to a preferred embodiment thereof, it will be understood by those skilled in the art that various changes in form and details may be made therein without departing from the spirit and scope of the invention.

What is claimed is:

1. A system for measuring latency on a device which includes a user interface that receives touch input and provides output in response thereto, comprising:
    a body separate from the device;
    a first sensor operatively attached to the body for detecting a touch event input to the device at a first time;
    a second sensor for detecting a response output from the device at a second time, the response being responsive to the touch event;
    a computational engine for computing a time differential between the first time and the second time; and,
    output device configured to output an indication of a measurement of latency in the device, the measurement being reflective of the time differential between the first time and the second time.

2. The system for measuring latency of claim 1, wherein the body comprises a proximal end and a distal end, the proximal end of the body being shaped to be operable as a handle and the distal end of the body having the first sensor attached thereto, the body being configured to allow a user to hold the proximal end and cause distal end to tap on the device.

3. The system for measuring latency of claim 1, wherein the second sensor is operably attached to the body in close proximity to the first sensor.

4. The system for measuring latency of claim 1, wherein the response comprises a graphical response and the second sensor comprises a graphical change sensor.

5. The system for measuring latency of claim 1, wherein the response comprises an audial response and the second sensor comprises an audial sensor.

6. The system for measuring latency of claim 1, wherein the response is a vibrotactile response and the second sensor comprises a vibration sensor.

7. The system for measuring latency of claim 1, wherein the latency comprises end-to-end latency.

8. The system for measuring latency of claim 1, wherein the user interface is a direct-manipulation user interface.

9. The system for measuring latency of claim 1, wherein the first sensor comprises a contact sensor.

10. The system for measuring latency of claim 9, wherein the contact sensor comprises a transducer that converts mechanical shock into an electrical signal.

11. The system for measuring latency of claim 10, further comprising a light source configured to illuminate a display area of the device.

12. The system for measuring latency of claim 10, wherein the transducer comprises a ferroelectric transducer.

13. The system for measuring latency of claim 10, wherein the transducer comprises an accelerometer.

14. The system for measuring latency of claim 1, wherein the second sensor comprises a graphical change sensor.

15. The system for measuring latency of claim 14, wherein the graphical change sensor comprises a photodetector that converts light into an electrical signal.

16. The system for measuring latency of claim 15, wherein the photodetector comprises a reverse-biased LED that acts as a photodiode.

17. The system for measuring latency of claim 15, wherein the photodetector comprises at least one selected from the group consisting of: an active pixel sensor, a charge-coupled device, a photoresistor, a photovoltaic cell, a photodiode, photomultiplier, phototube or quantum-dot photoconductor.

18. The system for measuring latency of claim 1, wherein the device is a smart phone, tablet or computer.

19. The system for measuring latency of claim 1, wherein the system configured to display latency in a sensing/processing/display.

20. The system for measuring latency of claim 1, wherein the device is a touch-sensitive device.

21. The system for measuring latency of claim 20, wherein the device is a stylus-sensitive device.

22. The system for measuring latency of claim 21, wherein the time delay that is due to internal components of the system is fixed.

23. The system for measuring latency of claim 21, wherein the time delay that is due to internal components of the system is detected.

24. The system for measuring latency of claim 21, wherein the time delay that is due to internal components of the system is estimated.

25. The system for measuring latency of claim 24, wherein the read-out display comprises a display of the device and wherein the system comprises a communication interface for communicating with the device.

26. The system for measuring latency of claim 1, wherein the device is a multi-touch-sensitive device.

27. The system for measuring latency of claim 26, wherein the device is a stylus-sensitive device.

28. The system for measuring latency of claim 1, wherein the device is a stylus-sensitive device.

29. The system for measuring latency of claim 1, wherein the first sensor and the second sensor are selected or configured such that a latency associated with the first sensor and a latency associated with the second sensor, taken together, are less than the latency of the device.

30. The system for measuring latency of claim 1, wherein the measurement of latency is created at least in part by subtracting a time delay that is due to internal components of the system from the time differential.

31. The system for measuring latency of claim 1, wherein the computational engine comprises at least one selected from the group consisting of:
 a system-on-a-chip, a central-processing unit, a microcontroller-unit, a field-programmable gate-array, a NAND memory, a vertical NAND memory, a random-access memory, a resistive random-access memory or a magneto-resistive random-access memory.

32. The system for measuring latency of claim 31, wherein the communication interface comprises a wireless network.

33. The system for measuring latency of claim 1, wherein the computational engine comprises a processor of the device.

34. The system for measuring latency of claim 1, wherein the computational engine comprises a processor on an external device, the external device being operatively connected to the first and second sensors, and to the output device.

35. The system for measuring latency of claim 34, wherein the computational engine is operatively connected to the first sensor via a wireless communication interface.

36. The system for measuring latency of claim 34, wherein the computational engine is operatively connected to the first sensor via a wired communication interface.

37. The system for measuring latency of claim 34, wherein the computational engine is operatively connected to the second sensor via a wireless communication interface.

38. The system for measuring latency of claim 34, wherein the computational engine is operatively connected to the second sensor via a wired communication interface.

39. The system for measuring latency of claim 34, wherein the computational engine is operatively connected to the output device via a wireless communication interface.

40. The system for measuring latency of claim 34, wherein the computational engine is operatively connected to the output device via a wired communication interface.

41. The system for measuring latency of claim 34, wherein the computational engine is operatively connected to the first sensor via a wired communication interface and the second sensor via a wireless communication interface.

42. The system for measuring latency of claim 34, wherein the computational engine is operatively connected to the second sensor via a wired communication interface and the first sensor via a wireless communication interface.

43. The system for measuring latency of claim 36, further comprising an actuator for moving the common housing into contact with the user interface.

44. The system for measuring latency of claim 34, wherein the system is configured to use data representing the measured position and velocity to determine end-to-end touch-drag latency of the device.

45. The system for measuring latency of claim 1, wherein the output comprises a read-out display.

46. The system for measuring latency of claim 1, wherein the body comprises a distal end having a contact area, the contact area comprising a material having properties such that physical contact between the contact area and a touchscreen of the device will produce touch input to the device.

47. The system for measuring latency of claim 1, wherein the second sensor comprises an audial sensor.

48. The system for measuring latency of claim 1, further comprising a contact area, at least a portion of the contact area being formed from discrete pieces of dielectric or conductive material that are brought into physical contact with the user interface by one or more linear actuators, the linear actuators and pieces of dielectric or conductive material being controlled by signaling from the computational engine.

49. The system for measuring latency of claim 1, further comprising circuitry for measuring a position and a velocity of the system as it is moved across the user interface.

50. The system for measuring latency of claim 1, wherein the body comprises a common housing and a stable housing, the stable housing comprising a material which is not sensed by the user interface of the device, the common housing being movable with respect to the stable housing when the stable housing is resting on the user interface of the device, such that the common housing can be moved into contact with the user interface in a repeatable manner.

51. The system for measuring latency of claim 1, wherein the indication of a measurement is a qualitative indication.

52. The system for measuring latency of claim 1, wherein the indication of a measurement is a quantitative indication.

53. The system for measuring latency of claim 1, wherein the output device is at least one selected from the set of: a graphical display, a speaker, a light, a light reflective indicator and a haptic output.

54. A system for measuring latency in a device which includes a user interface that receives user input and provides output in response thereto, comprising:
- a body separate from the device;
- a signal emitter that emits a signal at a first time that a controller of the device would interpret as a physical touch event, whereby a simulated physical touch event is triggered in the device;
- a sensor for detecting a response output from the device at a second time, the response being responsive to the touch event;
- a computational engine for computing a time differential between the first time and the second time; and,
- output configured to output a measurement of latency in the device, the measurement being reflective of the time differential between the first time and the second time.

55. The system for measuring latency of claim 54, wherein the device is configured to display a graphical marker at a location on its display at which the device has determined the physical touch event to have occurred.

56. The system for measuring latency of claim 54, wherein the device is configured to generate an output to aid in the positioning of the signal emitted by the signal emitter.

57. The system for measuring latency of claim 54, wherein the device is configured to generate an output to aid in the positioning of the simulated physical touch event.

58. The system for measuring latency of claim 54, wherein the output to aid in the positioning is a graphical marker.

59. The system for measuring latency of claim 54, further comprising a contact area, at least a portion of the contact area being formed from a dielectric material whose dielectric characteristics are altered by a signal controlled by the computational engine, whereby the simulated touch event is triggered in the device.

* * * * *